United States Patent
Novak et al.

(10) Patent No.: US 9,720,685 B2
(45) Date of Patent: Aug. 1, 2017

(54) SOFTWARE DEVELOPMENT ACTIVITY

(75) Inventors: Miroslav Novak, Prague (CZ); Albert Regner, Karlovy Vary (CZ); Vojtech Janota, Prague (CZ)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 14/387,627

(22) PCT Filed: Mar. 30, 2012

(86) PCT No.: PCT/US2012/031433
§ 371 (c)(1),
(2), (4) Date: Sep. 24, 2014

(87) PCT Pub. No.: WO2013/147842
PCT Pub. Date: Oct. 3, 2013

(65) Prior Publication Data
US 2015/0095876 A1    Apr. 2, 2015

(51) Int. Cl.
*G06F 9/45* (2006.01)
*G06F 9/44* (2006.01)
*G06Q 10/10* (2012.01)
*G06Q 10/06* (2012.01)

(52) U.S. Cl.
CPC .................. *G06F 8/71* (2013.01); *G06F 8/33* (2013.01); *G06Q 10/06395* (2013.01); *G06Q 10/101* (2013.01); *G06Q 10/103* (2013.01)

(58) Field of Classification Search
None
See application file for complete search history.

(56) References Cited

U.S. PATENT DOCUMENTS

| | | | |
|---|---|---|---|
| 7,596,778 B2 | 9/2009 | Kolawa et al. | |
| 7,610,342 B1* | 10/2009 | Pettigrew et al. | 709/206 |
| 7,716,649 B2 | 5/2010 | Clemm et al. | |
| 8,370,803 B1* | 2/2013 | Holler | G06F 8/36 717/101 |
| 2002/0078406 A1 | 6/2002 | Kondoh et al. | |
| 2003/0093716 A1 | 5/2003 | Farchi et al. | |
| 2004/0083464 A1 | 4/2004 | Cwalina et al. | |
| 2005/0015675 A1* | 1/2005 | Kolawa et al. | 714/38 |
| 2005/0223354 A1 | 10/2005 | Drissi et al. | |
| 2008/0301639 A1 | 12/2008 | Bell et al. | |
| 2009/0138861 A1 | 5/2009 | Terpolilli | |
| 2009/0300585 A1 | 12/2009 | Meenakshisundaram et al. | |
| 2010/0333069 A1 | 12/2010 | Chandra et al. | |
| 2011/0047334 A1 | 2/2011 | Eichenberger et al. | |
| 2011/0078211 A1* | 3/2011 | Gass | G06F 8/65 707/803 |
| 2011/0258605 A1 | 10/2011 | Ioannou et al. | |

(Continued)

OTHER PUBLICATIONS

Leblang, David. "Managing the software development process with ClearGuide." Software Configuration Management, 1997, pp. 66-80.*

(Continued)

*Primary Examiner* — Chameli Das
*Assistant Examiner* — Joanne Macasiano
(74) *Attorney, Agent, or Firm* — Mannava & Kang, P.C.

(57) ABSTRACT

Disclosed herein is a system and method that determine whether activity pertaining to a software development project violates at least one development rule whose associated severity level exceeds a predetermined threshold.

20 Claims, 4 Drawing Sheets

(56) References Cited

U.S. PATENT DOCUMENTS

2011/0295854 A1* 12/2011 Chiticariu et al. ............ 707/737
2012/0016701 A1*  1/2012 Narendra et al. ............ 705/7.11
2012/0284691 A1* 11/2012 Aljammaz ................ G06F 9/44
                                                    717/120
2014/0033165 A1*  1/2014 Hightower ................ G06F 8/36
                                                    717/101

OTHER PUBLICATIONS

Bontcheva et al. "Evolving GATE to meet new challenges in language engineering." Natural Language Engineering vol. 10 Issue 3-4, Sep. 2004, pp. 349-373.*
Korean Intellectual Property Office, International Search Report and Written Opinion, Nov. 29, 2012, 8 pages, Daejeon Metropolitan City, Republic of Korea.

* cited by examiner

SOFTWARE DEVELOPMENT ACTIVITY

BACKGROUND

Teams of software engineers may participate in the development and maintenance of a software application. Typically, two or more groups of developers may work independently on the same source code base or even the same source code file. Software development projects may be managed using an application lifecycle management ("ALM") platform that may include source code management ("SCM") components. The SCM components allow different developers to make changes to the same source code and track who made changes therein and when those changes were submitted. Every change in the ALM platform may be associated with a version of the software and all new releases may be managed therewith. Software development entities may have different policies regarding source code changes. By way of example, an entity may require all developers to submit their source code changes no later than one month before a public release. ALM software may generate logs to keep track of all source code changes. A manager may peruse such logs to determine whether a developer violated any policies issued by the entity.

DETAILED DESCRIPTION

Introduction: As noted above, software development entities may have different policies governing software development projects. However, many entities have development teams that are fragmented across different regions. The advent of globalization allows software professionals across the globe to carry out various software development activities upon the same code base. Furthermore, an application may have countless lines of source code spread out across several hundred source code files and many source code updates may be submitted daily. As such, it can be burdensome and costly to visually monitor development activity and ensure their compliance with development rules and procedures.

In view of the foregoing, various examples disclosed herein provide a system and method that determine whether activity pertaining to a software development project violates at least one development rule whose associated severity level exceeds a predetermined threshold. If the activity violates the at least one development rule whose associated severity level exceeds the predetermined threshold, a work item may be generated that advises a user to correct the activity. The aspects, features and advantages of the application will be appreciated when considered with reference to the following description of examples and accompanying figures. The following description does not limit the application; rather, the scope of the application is defined by the appended claims and equivalents. The present application is divided into sections. The first, labeled "Components," describes examples of various physical and logical components for implementing aspects of the present disclosure. The second section, labeled "Operation," discloses a working example of the system and method. Finally, the secton labeled "Conclusion" summarizes the detailed description.

Figure 1:
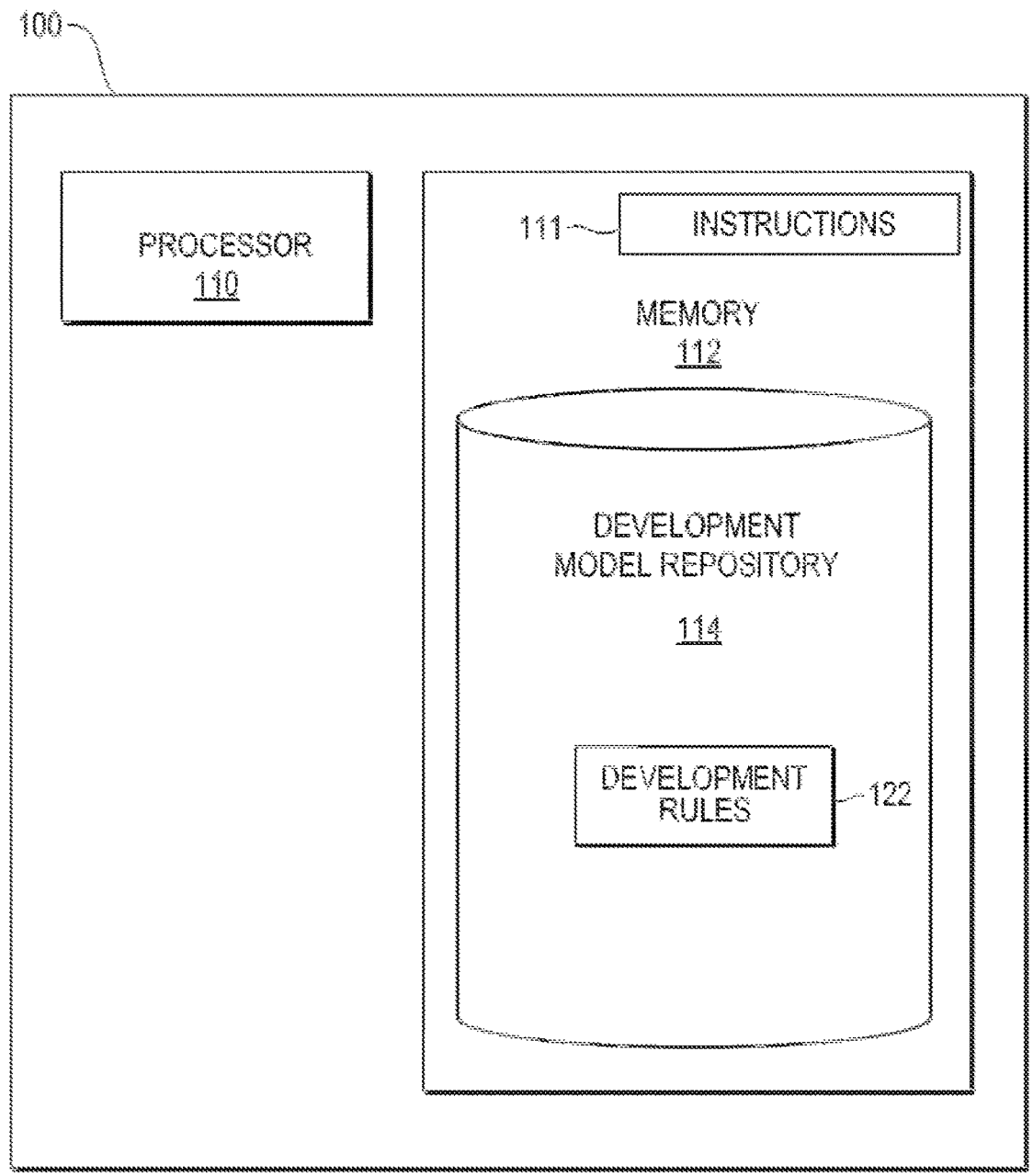
FIG. 1 is a close up illustration of a computer apparatus in accordance with aspects of the disclosure.

Components: FIG. 1 presents a schematic diagram of an illustrative computer apparatus 100 depicting various components in accordance with aspects of the disclosure. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer appartus 100 may also comprise a network interface (not shown) to communicate with other devices over a network using conventional protocols (e.g., Ethernet, Wi-Fi, Bluetooth, etc.).

The computer apparatus 100 may also contain a processor 110 and memory 112. Memory 112 may store instructions that may be retrieved and executed by processor 110. In one example, memory 112 may be a random access memory ("RAM") device. In a further example, memory 112 may be divided into multiple memory segments organized as dual-line memory modules (DIMMs). Alternatively, memory 112 may comprise other types of devices, such as memory provided on floppy disk drives, tapes, and hard disk drives, or other storage devices that may be coupled to computer apparatus 100 directly or indirectly. The memory may also include any combination of one or more of the foregoing and/or other devices as well. The processor 110 may be any number of well known processors, such as processors from Intel® Corporation. In another example, the processor may be a dedicated controller for executing operations, such as an application specfic integrated circuit ("ASIC"). Although all the components of computer apparatus 100 are functionally illustrated in FIG. 1 as being within the same block, it will be understood that the components may or may not be stored within the same physical housing. Furthermore, computer apparatus 100 may actually comprise multiple processors and memories working in tandem.

The instructions 111 residing in memory 112 may comprise any set of instructions to be executed directly (such as machine code) or indirectly (such as scripts) by the processor(s). In that regard, the terms "instructions," "steps" and "programs" may be used interchangeably herein. The instructions may be stored in any computer language or format, such as in object code or modules of source code. Furthermore, it is understood that the instructions may be implemented in the form of hardware, software, or a combination of hardward and software and that the examples herein are merely illustrative. Functions, methods and routine of instructions 111 are explained in more detail below.

Instructions 111 may be realized in any non-transitory computer-readable media for use by or in connection with an instruction execution system such as a computer 100, an ASIC, or other system that can fetch or obtain the logic from non-transitory computer-readable media and execute the instructions contained therein. "Non-transitory computer-readable media" can be any media that can contain, store, or maintain programs and data for use by or in connection with the instruction execution system. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, or a portable compact disc.

Memory 112 may also store development model repository 114. The data stored in such repository may be retrieved, stored, or modified by processor 110. Although the architecture of development model repository 114 is not limited to any particular database structure or product, the data thereof may be stored in computer registers, in a relational database as tables having a plurality of different columns and records, XML documents or flat files. The data stored in development model repository 114 may comprise any information sufficient to identify the relevant data, such as numbers, descriptive text, proprietary codes, references to data stored in other areas of the same memory or different memories (including other network locations) or information that is used by a function to calculate the relevant data.

Development model repository 114 may include any data pertaining to a software development project, such as source code, data associated with ALM, data associated with quality assurance ("QA") testing, data associated with compilation of a software version, or data associated with software performance testing. It is understood that the foregoing is a non-exhaustive list of items that may be included in development model repository 114. As such, development model repository 114 may be a common platform for managing the lifecycle of a software development project from design through release.

Development rules 122 may govern activity, such as user activity, that triggers changes in development model repository 114. Instructions 111 may utilize these development rules to enforce policies and procedures issued by a software development entity. Any activity occurring in the system may be analyzed in view of said rules. A non-exhaustive list of activities may be a change to at least one source code file, the QA testing of software, compilation of source code, or delivery of an executable file. Each activity type may be associated with data, such as an identification of work items associated therewith, the time the activity occurred, source code files that may have been affected, or the number of developers working on the activity.

A development rule may be associated with configurable attributes, such as a name, a description, a condition or a severity level. In one example, activity complies with each development rule, when the activity satisfies a condition associated with each development rule. While a condition associated with a development rule may be configurable, some development rules may be default rules associated with a default condition. The following is a non-exhaustive list of possible default conditions; a source code change cannot be associated with another change that represents a defect that was already fixed; a source code change cannot interfere with other source code that is currently under development; or, a source code change cannot interfere with another work item associated with many changes. In one example, one development rule may be associated with more than one condition.

In a further example, activity that violates at least one development rule may be flagged so as to report the activity to a user. Instructions 111 may cause a processor to generate a report of such flagged activities. In addition to satisfying the condition associated with a development rule, the severity level associated with the development rule may also be considered. In one example, activity may be brought to the attention of a user, when it fails the condition associated with at least one development rule and when the severity level associated with the at least one development rule exceeds a predetermined threshold. If the severity level does not exceed a predetermined threhold, the activity may be permitted, notwithstanding the rule violation. As will be discussed below, instructions 111 may cause processor 110 to suggest, via a display, an adjustment of the severity level to a level above or below the predetermined threshold when certain conditions are met. The development rules 122 may be divided into categories, such as a defect category or an enhancement category.

As noted above, a message suggesting an adjustment of the severity level may be presented to a user via a display. While the detection of development rule violations aim to be as accurate as possible, the generation of "false positives" is still likely. Therefore, in one aspect of the present disclosure, instructions 111 may cause processor 110 to display a message suggesting a decrease of the severity level associated with a development rule to a level below the threshold level, when a number of activities are erroneously determined to violate the development rule. By way of example, if 5% of the violations reported for a development rule are false positives, it may be suggested that the severity level associated therewith be adjusted to a level below the threshold level. Such adjustment may allow false positives to be ignored. In another example, after the generation of a software release, a message may be displayed that suggests lowering the severity level associated with development rules having the most erroneous violations, such as the top three development rules having the most erroneous violations.

In a further example, instructions 111 may cause processor 110 to display a message suggesting an increase of the severity level associated with a development rule to a level above the threshold level, when a number of source code changes are implemented to correct undetected violations of a development rule. For example, if 50% of source code changes represent corrections of undetected development rule violations, a message may be displayed that suggests raising the severity level associated with said development rule to a level above the threshold level. After the generation of a software release, a further message may be displayed that suggests raising the severity level associated with development rules having the most undetected violations to a level above the threshold level, such as the top three development rules having the most undetected violations. In yet a further example, instructions 111 may cause processor 110 to display a message that suggests raising the severity level associated with a development rule to a level above the threshold level, when a number of violations of the development rule correlate with a number of defects detected in source code files contained in development model repository 114. The correlation may be detected using a correlation algorithm, such as Pearson's correlation test.

Figure 2:
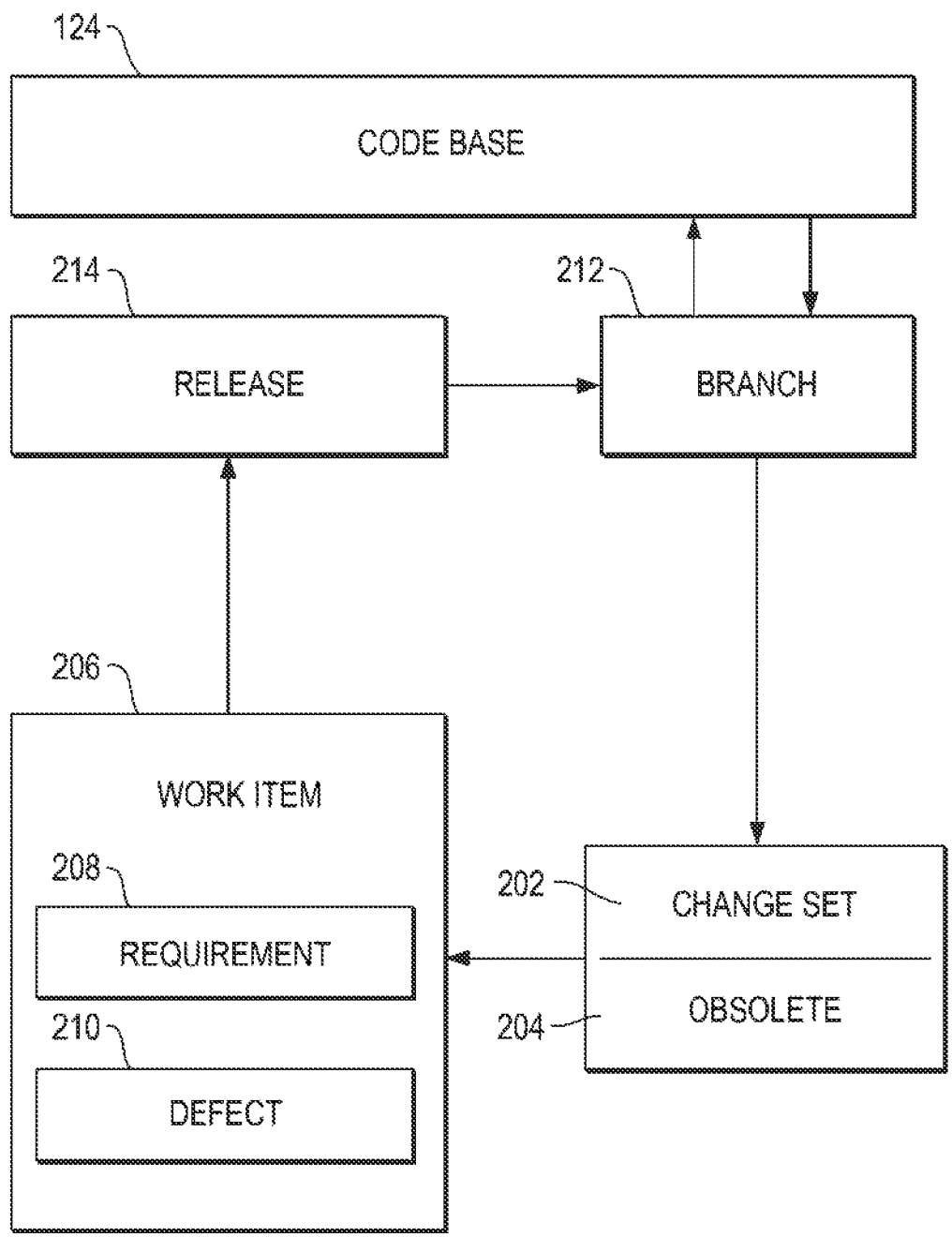
FIG. 2 is an example of associations in accordance with aspects of the present disclosure.

As noted above, activity pertaining to a software development project may include a change to at least one source code file. FIG. 2 is an example illustrating one possible scheme for representing source code changes in development model repository 114. Change set 202 may represent a change to at least one source code file. Change set 202 may also include a Boolean obsolete flag 204. Boolean obsolete flag 204 may be assigned a value of true, if another change set preempts change set 202 such that the preempting change set fixes the same defect or adds the same enhancement as change set 202. This allows software professionals to simultaneously develop and test a plurality of software solutions to the same problem and select the best solution therefrom.

In one example, a change set may be ignored if the obsolete flag equals "true." Change set 202 may be associated with a work item 206. A work item may represent a software development task, such as a fix to a defect or the addition of a new requirement or feature. A software development task may also include testing of a software build, compilation of software, or a software release. As shown in FIG. 2, work item 206 may be associated with a Boolean requirement field 208 and a Boolean defect field 210. In one example, the requirement field 208 may be assigned a value of "true" and defect field 210 may be assigned a value of "false," if work item 206 represents a software enhancement. The values of requirement field 208 and defect field 210 may be reversed, if work item 206 represents a fix to a defect. In one example, work item 206 may be associated with a software release 214. In turn, software release 214 may be associated with a development branch 212 extending from code base 124.

Figure 3:
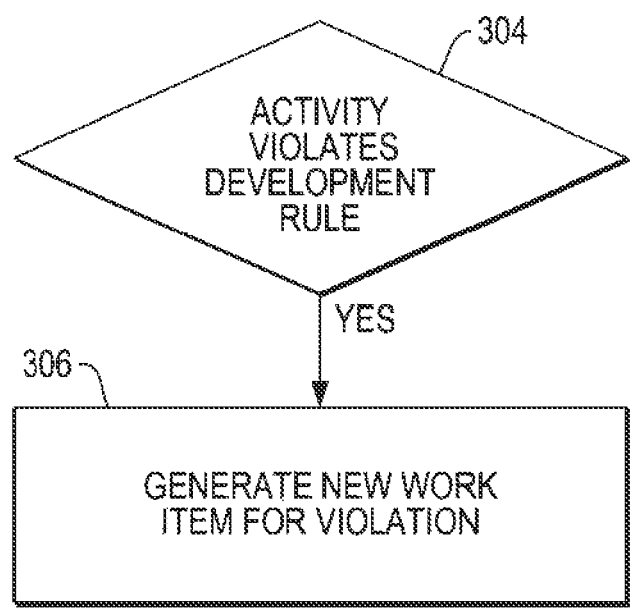
FIG. 3 is an example of a flow diagram in accordance with aspects of the disclosure.
Figure 4A:
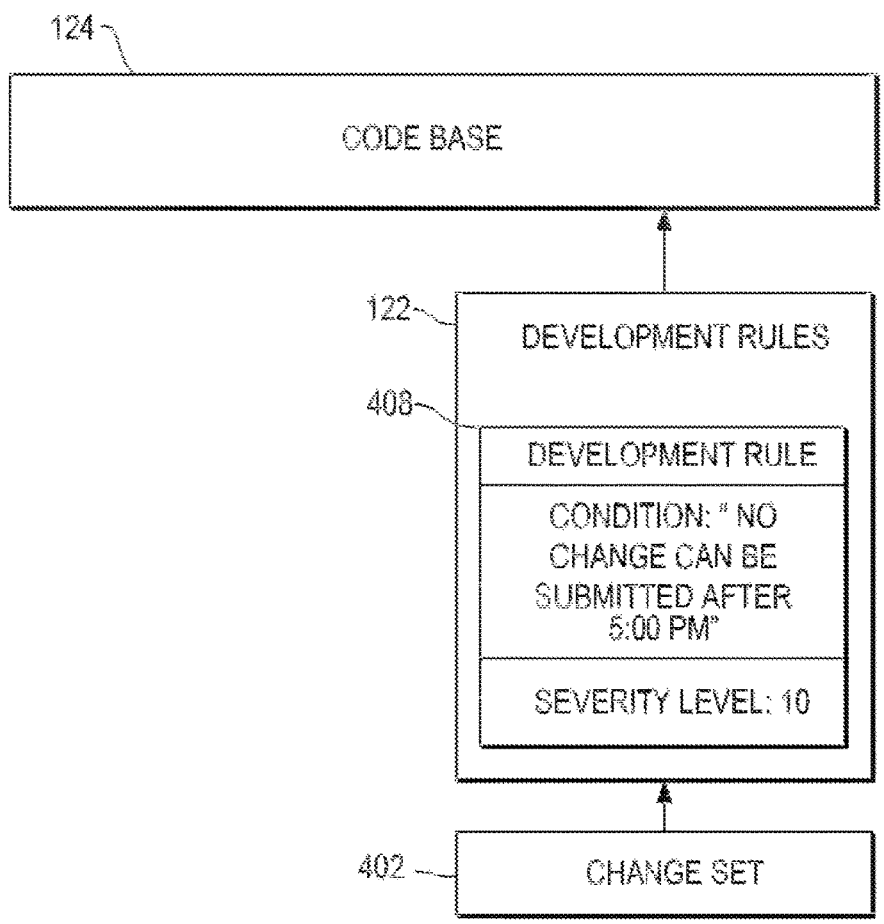
FIG. 4A is a working example of source code tracking in accordance with aspects of the present disclosure.
Figure 4B:
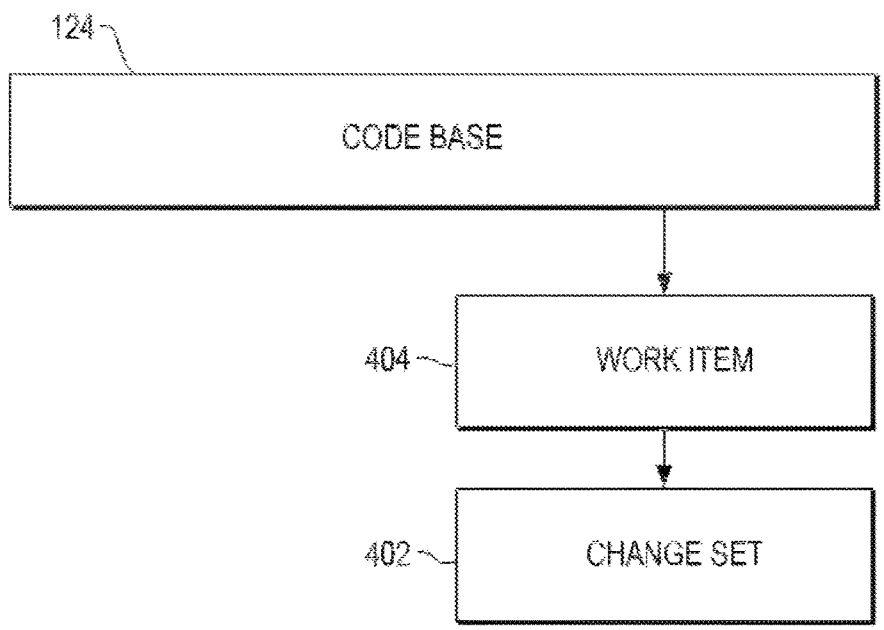
FIG. 4B is a further working example of source code tracking in accordance with aspects of the present disclosure.

Operation: One working example of a system and method of software development management is shown in FIGS. 3-4B. In particular, FIG. 3 illustrates a flow diagram of an illustrative process of software development management. FIGS. 4A-B show different aspects of software development management in accordance with aspects of the present disclosure. The actions shown in FIGS. 4A-B will be discussed below with regard to the flow diagram of FIG. 3.

In block 304 of FIG. 3, it may be determined whether activity violates at least one development rule whose associated severity level exceeds a predetermined threshold. The activity may be any activity pertaining to a software development project. The example in FIG. 4A shows source code change activity represented by change set 402. In the example of FIG. 4A, change set 402 is being submitted to development model repository 114. Change set 402 may be analyzed in view of development rules 122. Such analyzed may include determining whether the data associated with change set 202 satisfies a condition associated with at least one development rule. By way of example, FIG. 4B depicts one development rule associated with a severity level of eight or higher will be rejected and flagged. Assuming change set 402 was submitted at 5:30 PM, change set 402 will be rejected and brought to the attention of a user. Referring back to FIG. 3, if it is determined that the activity violates at least one development rule whose associated severity level exceeds a predetermined threshold, a new work item may be generated, as shown in block 306. The new work item may be associated with the non-compliant activity, which is represented by change set 402 in the example of FIGS. 4A-B. Referring now to FIG. 4B, a new work item 404 is shown to be generated from code base 124. The new work item 404 may be associated with the change set 402. New work item 404 may advise a user to correct the non-compliant activity.

Conclusion: Advantageously, the above-described system and method monitor activity occurring in software development projects and detect patterns that may violate software development policies. In this regard, software development managers can detect risky activity with ease. In turn, large software development projects may be carried out in a more orderly fashion.

Although the disclosure herein has been described with reference to particular examples, it is to be understood that these example are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, processes may be performed in a different order or concurrently.

The invention claimed is:

1. A system comprising:
a development model repository comprising data pertaining to a software development project;
development rules that govern changes in the development model repository; and
a processor to:
determine whether activity pertaining to the software development project violates at least one development rule whose associated severity level exceeds a predetermined threshold; and
in response to the activity violating the at least one development rule whose associated severity level exceeds the predetermined threshold, generate a work item that advises a user to correct the activity, wherein the work item represents a software development task to perform at least one of fixing a defect or adding a new requirement or feature;
suggest, via a display, a first adjustment to the severity level indicating a severity of the activity violating the at least one development rule in response to a first condition being met prior to generation of a software release, the first adjustment decreasing the severity level below the predetermined threshold; and
suggest, via the display, a second adjustment to the severity level indicating the severity of the activity violating the at least one development rule in response to a second condition being met after the generation of the software release, the second adjustment increasing the severity level above the predetermined threshold.

2. The system of claim 1, wherein the processor is a processor to determine whether the activity satisfies a condition associated with the at least one development rule so as to determine whether the activity violates the at least one development rule.

3. The system of claim 1, wherein the processor is a processor to display a message suggesting a decrease of a severity level associated with a development rule to a level below the predetermined threshold, when a number of activities are erroneously determined to violate the development rule.

4. The system of claim 1, wherein the processor is a processor to display a message that suggests an increase of a severity level associated with a development rule to a level above the predetermined threshold, when a correlation exists between a number of violations of the development rule and a number of defects found in source code files contained in the development model repository.

5. The system of claim 1, wherein the activity is a change to at least one source code file.

6. The system of claim 1, wherein the development model repository is a platform for managing a lifecycle of the software development project from design through release.

7. The system of claim 1, wherein the development rules enforce policies and procedures issued by a software development entity associated with the software development project.

8. The system of claim 1, wherein each of the development rules is associated with a configurable attribute including at least one of a name, a description, a condition, and the severity level.

9. The system of claim 1, wherein the first condition is associated with a number of false positives of activity violations of the at least one development rule, the first adjustment decreasing the severity level to permit the false positives to be ignored.

10. The system of claim 9, wherein the second condition is associated with undetected activity violations of the at least one development rule, the second adjustment increasing the security level to permit the undetected activity violations to be detected.

11. A non-transitory computer readable medium having instructions stored therein which, if executed, cause a processor to:
  determine whether activity pertaining to a software development project violates at least one development rule whose associated severity level exceeds a predetermined threshold; and
  in response to the activity violating the at least one development rule whose associated severity level exceeds the predetermined threshold, generate a work item that advises a user to correct the activity,
    wherein the work item represents a software development task to perform at least one of fixing a defect or adding a new requirement or feature;
  suggest, via a display, a first adjustment to the severity level indicating a severity of the activity violating the at least one development rule in response to a first condition being met prior to generation of a software release; and
  suggest, via the display, a second adjustment to the severity level indicating the severity of the activity violating the at least one development rule in response to a second condition being met after the generation of the software release,
  wherein determination as to whether the activity violates the at least one development rule occurs just if the severity level of the at least one development rule exceeds the predetermined threshold.

12. The non-transitory computer readable medium of claim 11, wherein the instructions stored therein, if executed, further cause the processor to:
  determine whether the activity satisfies a condition associated with the at least one development rule so as to determine whether the activity violates the at least one development rule.

13. The non-transitory computer readable medium of claim 11, wherein the instructions stored therein, if executed, further cause the processor to:
  display a message suggesting a decrease of a severity level associated with a development rule to a level below the predetermined threshold, when a number of activities are erroneously determined to violate the development rule.

14. The non-transitory computer readable medium of claim 11, wherein the instructions stored therein, if executed, further cause the processor to:
  display a message that suggests an increase of a severity level associated with a development rule to a level above the predetermined threshold, when a correlation exists between a number of violations of the development rule and a number of defects found in source code files associated with the software development project.

15. The non-transitory computer readable medium of claim 11, wherein the activity is a change to at least one source code file.

16. A method comprising:
  determining, using a processor, whether activity pertaining to a software development project violates at least one development rule whose associated severity level exceeds a predetermined threshold; and
  in response to the activity violating the at least one development rule whose associated severity level exceeds the predetermined threshold, associating, using the processor, the activity with a work item that represents a software development task that advises a user to correct the activity such that the activity complies with the at least one development rule,
    wherein the work item represents a software development task to perform at least one of fixing a defect or adding a new requirement or feature;
  suggesting, via a display, a first adjustment to the severity level indicating a severity of the activity violating the at least one development rule in response to a first condition being met prior to generation of a software release, the first adjustment decreasing the severity level below the predetermined threshold; and
  suggesting, via the display, a second adjustment to the severity level indicating the severity of the activity violating the at least one development rule in response to a second condition being met after the generation of the software release, the second adjustment decreasing the severity level above the predetermined threshold,
  wherein determination as to whether the activity violates the at least one development rule occurs just if the severity level of the at least one development rule exceeds the predetermined threshold.

17. The method of claim 16, further comprising displaying a message suggesting a decrease of a severity level associated with a development rule to a level below the predetermined threshold, when a number of activities are erroneously determined to violate the development rule.

18. The method of claim 16, further comprising displaying a message that suggests an increase of a severity level associated with a development rule to a level above the predetermined threshold, when a correlation exists between a number of violations of the development rule and a number of defects found in source code files relevant to the software development project.

19. The method of claim 16, further comprising displaying a message that suggests an increase of a severity level associated with a development rule to a level above the predetermined threshold, when there are a number of source code changes implemented to correct undetected violations of the development rule.

20. The method of claim 16, wherein the activity represents a change to at least one source code file.

\* \* \* \* \*